Figure 6:
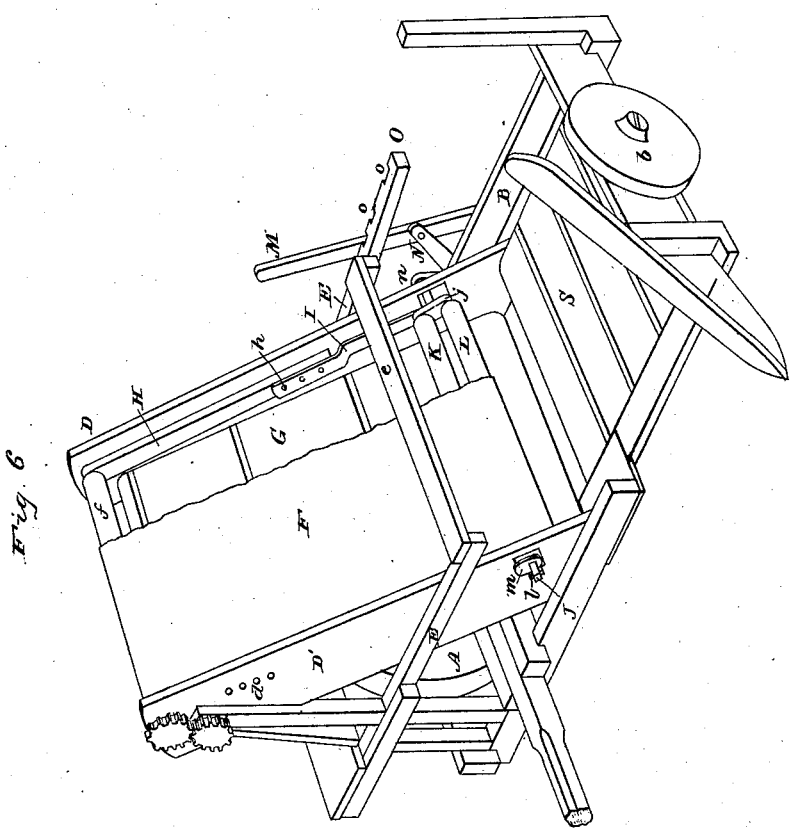

(No Model.) 2 Sheets—Sheet 1.
E. M. DEANE.
HAY AND GRAIN ELEVATOR.
No. 244,715. Patented July 19, 1881.
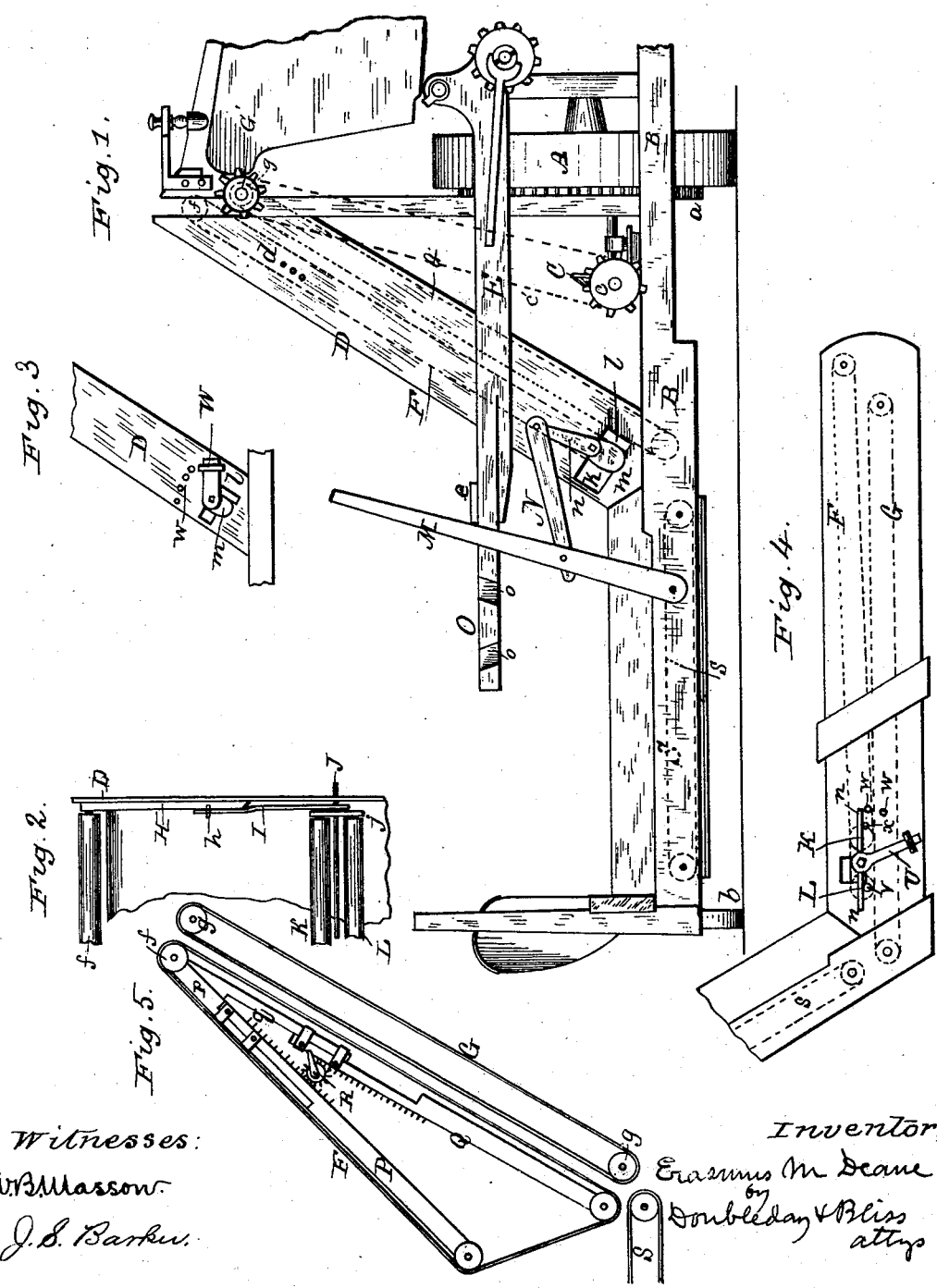
Witnesses:
W. B. Masson
J. S. Barker
Inventor:
Erasmus M. Deane
by Doubleday & Bliss
attys (No Model.) 2 Sheets—Sheet 2.

E. M. DEANE.
HAY AND GRAIN ELEVATOR.

No. 244,715. Patented July 19, 1881.

Witnesses:
H. N. Low
J. S. Barker.

Inventor
Erasmus M Deane
by
Doubleday & Bliss attys

UNITED STATES PATENT OFFICE.

ERASMUS M. DEANE, OF ST. PAUL, MINNESOTA.

HAY AND GRAIN ELEVATOR.

SPECIFICATION forming part of Letters Patent No. 244,715, dated July 19, 1881.

Application filed June 2, 1881. (No model.)

*To all whom it may concern:*

Be it known that I, ERASMUS M. DEANE, a citizen of the United States of America, residing at St. Paul, in the county of Ramsey and State of Minnesota, have invented certain new and useful Improvements in Hay and Grain Elevators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a rear elevation of so much of a harvester as is necessary to illustrate my invention. Fig. 2 is a front view of one end of the elevator-frame, showing the rollers and vibrating arm supporting the same. Fig. 3 shows a modification of the mechanism for shifting the position of the lower rollers. Fig. 4 is a rear view of another modification of the same devices. Fig. 5 is a vertical section, showing a modification of one part of my invention, and Fig. 6 is a perspective view of a harvester containing one form of my invention.

Referring to Figs. 1 and 6, A is the main drive-wheel; B, the rear sill of the frame-work; b, the supporting-wheel at the grain side of the machine; C, a bevel-gear the shaft of which is driven from a spur-gear, a, attached to the main drive-wheel; and c is a crank-wheel and sprocket-wheel driven by the bevel-wheel C.

D is the rear-side piece of the elevator-frame.

E is a horizontal bar at the rear of the machine, supporting one end of the seat-plank e.

F is the upper elevator-belt, supported at its upper end upon a roller, f. (See Figs. 1, 2, 5, and 6.)

G is the lower elevator-belt. The upper end of this lower belt is supported upon a roller, g, having its ends journaled in the frame of the machine, and carrying at one end a sprocket-wheel or belt-wheel, G', which is connected with the sprocket-wheel c by means of a chain, c', which is therefore caused to drive this elevator-belt, the other elevator-belt being driven by a spur-gear on the upper rollers.

H I is a vibrating arm or bar, pivoted, by preference, upon the shaft of roller f, the part I being, by preference, adjustable longitudinally upon the part H by means of a pin or bolt, h, two or more such bolts being ordinarily used, by preference, to prevent deflection of the part I relative to the part H, there being one of these links or bars at each side of the elevator-frame—that is, at the front side and at the rear side.

J is a shaft mounted in the lower ends of bars H I, and having rigidly attached thereto cross-heads j, in the ends of which are pivoted rollers K L. Each side bar is slotted near its lower end, as k.

l is a shoulder or abutment projecting from the rear side of side board, D.

m is a cam attached rigidly to the projecting end of shaft J, there being, by preference, a similar cam and shoulder, l, at the front side of the machine.

M is a hand-lever pivoted to the sill of the machine, and locked in position by being caused to engage with a series of notches in the rear face of the bar O, projecting from bar E or formed in one piece therewith.

N is a link connecting lever M with an arm, n, rigidly attached to shaft J.

By an examination of these figures it will be readily understood that the operator can, by means of hand-lever M and its connecting devices, rotate shaft J and rollers K L in such manner as to form a flaring throat between the lower end of the upper elevator-belt, F, and the lower elevator, as is more fully explained in my Patent No. 226,985, dated April 27, 1880; and it will be seen that the tension of the chain c' is in no wise affected by any change in the position of the lower end of the upper elevator-belt.

As the construction and operation of the devices shown in Figs. 3 and 4 are fully described and shown in my said patent, no further description of them need be given here.

In order to provide for maintaining the desired tension of the elevator-belt, the part I may be made adjustable relative to the part H either by means of slots or a series of bolt-holes in the upper overlapping ends of said parts I, through which the bolts pass; or, when preferred, the upper ends of the parts H may be pivoted to the side boards or the elevator-frame, some distance below the ends of the upper roller, in one or the other of holes d, in which case each vibrating bar may be made of a single piece, of either wood or metal, its upper end being adjustable toward or from the upper roller by means of a bolt or set-screw passing through one or another of the holes d. It will be seen that these vibrating bars form supports for the edges of the elevator-belt throughout practically the entire length of the belt when in the position shown by dotted lines in Fig. 1, and that when the lower end of the belt is spread by means of rollers K L the central and upper part of the belt will be supported at its edges against undue deflection by means of these vibrating bars.

In Fig. 5, P p are two sections of a rail, halved together near their upper ends, and connected by means of loops, so that the lower section, P, can slide longitudinally relative to the upper section, which is pivoted upon the shaft of roller f, the said part P being supported by ribs or cleats upon the side board of the elevator-frame.

Q q are two parts of a similar bar pivoted at its upper end to the same roller-shaft.

R is a pinion mounted on a shaft extending across the elevator from one side board to the other, and engaging with toothed racks upon the inner faces of the parts P Q of the bars. There are corresponding sliding bars, racks, and pinions upon the inner sides of the front and rear side bars, whereby the throat of the desired shape may be formed between the horizontal carrier S and the upper elevator-belt, F, as will be readily understood without further explanation. But I do not wish to be limited to the precise construction of sliding bars shown in Fig. 5, because some of the advantages of my invention could be derived by the use of the lower portions, P Q, only of the bars by securing them to the elevator-frame by cleats or clamps in such manner that the desired reciprocating movements could be imparted to them by the racks and pinions, although I prefer the construction shown. Neither do I wish to be limited to making the intermediate pivoted bars, upon which the lower ends of the elevator-belt are mounted, adjustable lengthwise, because, if it be found desirable to use any device to compensate for the change in the length of the belt the ends of the belt may be united by means of adjustable straps.

Nor do I wish to be limited to changing the position of the lower belt-supporting roller at the will of the operator, because it will be readily seen by an examination of Figs. 1 and 2 that the lower end of the upper elevator-belt is free to swing away from the lower elevator-belt, in order to admit any accumulation of grain which may be presented to the elevator.

I propose, under some circumstances, to dispense with the use of one of the rollers at the lower end of the elevator-belt, using in its place a single roller mounted in the lower ends of vibrating bars, with a single bar at each side of the elevator-belt, each bar being made of a single piece of wood or metal.

What I claim is—

1. In a hay or grain elevator, the combination, with the upper and lower rollers, around which the elevator-belt passes, of bars arranged within the belt, and having the lower roller supported in their lower ends, said bars being adjustable and adapted to move the lower roller toward and from the upper roller, substantially as set forth, and thereby regulate the tension of the belt.

2. In a hay or grain elevator, the combination, with the stationary elevator-frame and the upper and lower rollers, around which the upper belt passes, of longitudinal bars pivoted at or near their upper ends, and having the lower roller supported in their lower ends, and a belt for driving the elevator, so arranged that its tension shall not be changed by the movement of the lower end of the upper elevator-belt toward or from the lower elevator-belt, substantially as set forth.

3. In a hay or grain elevator, the combination, with the upper and lower rollers, around which the elevator-belt passes, of a longitudinally-adjustable bar engaging with the lower roller, and adjustably pivoted at its upper end, substantially as set forth.

4. The combination, with the belt F, of two diverging and adjustable bars, P Q, substantially as set forth.

In testimony whereof I affix my signature in presence of two witnesses.

ERASMUS M. DEANE.

Witnesses:
J. H. RANDALL,
JOHN J. McCLOUD.